US011497180B2

(12) United States Patent
Baik et al.

(10) Patent No.: US 11,497,180 B2
(45) Date of Patent: Nov. 15, 2022

(54) HYDROPONICS APPARATUS

(71) Applicant: NTHING, INC., Seoul (KR)

(72) Inventors: Kyeong Hoon Baik, Anyang-si (KR); Kang Hoon Lee, Icheon-si (KR)

(73) Assignee: NTHING, INC., Seoul (KR)

( * ) Notice: Subject to any disclaimer, the term of this patent is extended or adjusted under 35 U.S.C. 154(b) by 0 days.

(21) Appl. No.: 17/287,975

(22) PCT Filed: Oct. 22, 2019

(86) PCT No.: PCT/KR2019/013849
§ 371 (c)(1),
(2) Date: Apr. 22, 2021

(87) PCT Pub. No.: WO2020/085743
PCT Pub. Date: Apr. 30, 2020

(65) Prior Publication Data
US 2021/0307267 A1  Oct. 7, 2021

(30) Foreign Application Priority Data
Oct. 24, 2018  (KR) .................. 10-2018-0127767

(51) Int. Cl.
*A01G 31/02* (2006.01)
*A01G 7/04* (2006.01)
(Continued)

(52) U.S. Cl.
CPC ............ *A01G 31/02* (2013.01); *A01G 7/045* (2013.01); *F21V 23/0442* (2013.01); *F21Y 2115/10* (2016.08)

(58) Field of Classification Search
CPC .......... A01G 7/045; A01G 9/249; Y10S 47/06
See application file for complete search history.

(56) References Cited

U.S. PATENT DOCUMENTS 9,986,697 B1 * 6/2018 Gurin .................. A01G 31/06
2016/0360712 A1 * 12/2016 Yorio .................. A01G 31/06
2018/0213735 A1 * 8/2018 Vail .................... A01G 7/045

FOREIGN PATENT DOCUMENTS

KR  10-0817549 B1  3/2008
KR  10-2013-0065828 A  6/2013
(Continued)

OTHER PUBLICATIONS

International Search Report for PCT/KR2019/013849 dated Feb. 7, 2020 from Korean Intellectual Property Office.

*Primary Examiner* — William J Carter
(74) *Attorney, Agent, or Firm* — Revolution IP, PLLC

(57) ABSTRACT

A hydroponics apparatus includes a housing; two or more channels provided vertically on one side of the housing to be spaced apart from each other; brackets coupled to the channels; and cultivation modules seated on the brackets, wherein a plurality of cultivation modules is fitted and coupled to each other to have an extended form and water channels are formed to communicate with each other, the cultivation modules in the extended form are coupled to each channel and seated through a plurality of brackets disposed in a horizontal direction, and the plurality of brackets are coupled to the channels so that heights are gradually increased or decreased from one-side bracket in the horizontal direction to the other bracket in the horizontal direction to form an inclination of the water channel.

17 Claims, 10 Drawing Sheets

(51) Int. Cl.
*F21V 23/04* (2006.01)
*F21Y 115/10* (2016.01)

(56) References Cited

FOREIGN PATENT DOCUMENTS

| | | |
|---|---|---|
| KR | 10-1321336 B1 | 10/2013 |
| KR | 10-2014-0049249 A | 4/2014 |
| KR | 10-2014-0091663 A | 7/2014 |
| KR | 10-2015-0057733 A | 5/2015 |

* cited by examiner (a)        (b)

HYDROPONICS APPARATUS

CROSS REFERENCE TO PRIOR APPLICATIONS

This application is a National Stage Application of PCT International Patent Application No. PCT/KR2019/013849 filed on Oct. 22, 2019, under 35 U.S.C. § 371, which claims priority to Korean Patent Application No. 10-2018-0127767 filed on Oct. 24, 2018, respectively, which are all hereby incorporated by reference in their entirety.

TECHNICAL FIELD

The present invention relates to a hydroponics apparatus, and more particularly, to a hydroponics apparatus that implements a large-area and large-capacity plant factory that replaces a farm by deviating from conventional small-sized plant factories.

BACKGROUND ART

A plant factory is a technique for producing plants in a closed or semi-closed space that regulates an internal environment, and may refer to an environmental conservation production system for the purpose of safe grocery supply and anniversary supply of planting.

The plant factory is not affected by a hypothetical variation such as cold summer or warm winter, typhoon, and not damaged by pathogens or pests. Accordingly, plants can be supplied with quality such as a constant amount, a constant shape or taste, nutritious, and a stable price, and a stable price without bad harvest. Further, the plant factory is not invaded with pathogens or pests and not required for pesticide application to prevent and exterminate pathogens or pests. As a result, eco-friendly production by non-pesticides is enabled.

However, the plant factory developed far mainly consists of small plant factories, and it is difficult to replace a large-area farm. As described in prior arts, up to now, the problem is caused in that a cultivation module of the plant factory can not help having certain length and area. Therefore, there is a need for technologies that maximize the length and area of the cultivated module of the plant factory.

PRIOR ART

Korean Patent Registration No. 10-1321336 (Oct. 29, 2013)

DISCLOSURE

Technical Problem

The present invention is to solve the problems in the related art and an object of the present invention is to provide a hydroponics apparatus.

Technical Solution

According to an aspect of the present invention, there is provided a hydroponics apparatus including: a housing; two or more channels provided vertically on one side of the housing to be spaced apart from each other; brackets coupled to the channels; and cultivation modules seated on the brackets, wherein a plurality of cultivation modules is fitted and coupled to each other to have an extended form and water channels are formed to communicate with each other, the cultivation modules in the extended form are coupled to each channel and seated through a plurality of brackets disposed in a horizontal direction, and the plurality of brackets are coupled to the channels so that heights are gradually increased or decreased from one-side bracket in the horizontal direction to the other bracket in the horizontal direction to form an inclination of the water channel.

At this time, the cultivation modules in the extended form may be disposed with two or more multiple layers.

Further, two or more cultivation modules in the extended form may be disposed in parallel on at least one layer among the multiple layers.

Further, the cultivation module may include a base formed to have an opened upper portion and have a water channel formed therein in a longitudinal direction, and a cover disposed to cover the upper portion of the base.

The water channel may include a first area formed on a bottom surface of the base in a longitudinal direction and second areas formed at both sides of the first area to be inclined downward toward the first area.

The base may further include a water through hole formed in an end of the water channel and ribs disposed at both sides of the water through hole in the base to converge toward the water through hole.

The hydroponics apparatus may further include a drainage module connected to one end of the cultivation modules in the extended form, wherein the drainage module may include a flow path portion that is through-formed in a vertical direction so that water or a nutrient solution of the upper end is introduced into the upper portion and discharged to the lower portion.

The drainage module may be disposed in each of the plurality of layers, and the drainage module of the upper layer and the drainage module of the lower layer may be connected to each other through a pipe to form a drop-type drain path.

The cover may include at least one opening formed along a longitudinal direction of the cover so that the pot module is inserted and a grip portion formed to partially protrude from both sides along the longitudinal direction of the cover.

A plurality of openings may be symmetrically formed with respect to the center between one end and the other end of the cover in the longitudinal direction.

A plurality of openings may be asymmetrically formed with respect to the center between one end and the other end of the cover in the longitudinal direction.

The channel may include a plurality of fastening grooves in a longitudinal direction, and the bracket may include an insertion protrusion inserted into the fastening groove at one side.

The insertion protrusion may be formed to protrude into a '¬' shape on one side of the bracket.

The bracket may further include a buffer portion formed concavely in an area where the insertion protrusion starts to protrude.

The hydroponics apparatus may further include a light source module emitting light to the cultivation modules.

The light source module may be disposed on a lower surface of the cultivation module.

In the light source module, LED packages emitting white light and light at bands of 650 nm to 670 nm may be alternately mounted, and the number of LED packages emitting the white light may be greater than the number of LED packages emitting the light of 650 nm to 670 nm.

The hydroponics apparatus may further include a sensing module sensing at least one of temperature, humidity, and luminance in the housing; and a control panel controlling the water amount and the light amount supplied to the cultivation modules.

Advantageous Effects

According to the present invention, it is possible to secure a high-density cultivation structure with a large area and a large capacity and a hard fixing structure.

Further, it is possible to secure smooth water channel formation and a smooth moving structure of water or a nutrient solution.

Further, it is possible to more easily implement a large-capacity plant factory in a form of simply inserting pot modules into cultivation modules while implementing large-area and high-density cultivation modules.

Further, it is possible to maximize replacement of pot modules or management convenience of cultivation modules by applying a base and a cover separation structure.

MODES FOR THE INVENTION

Figure 1:
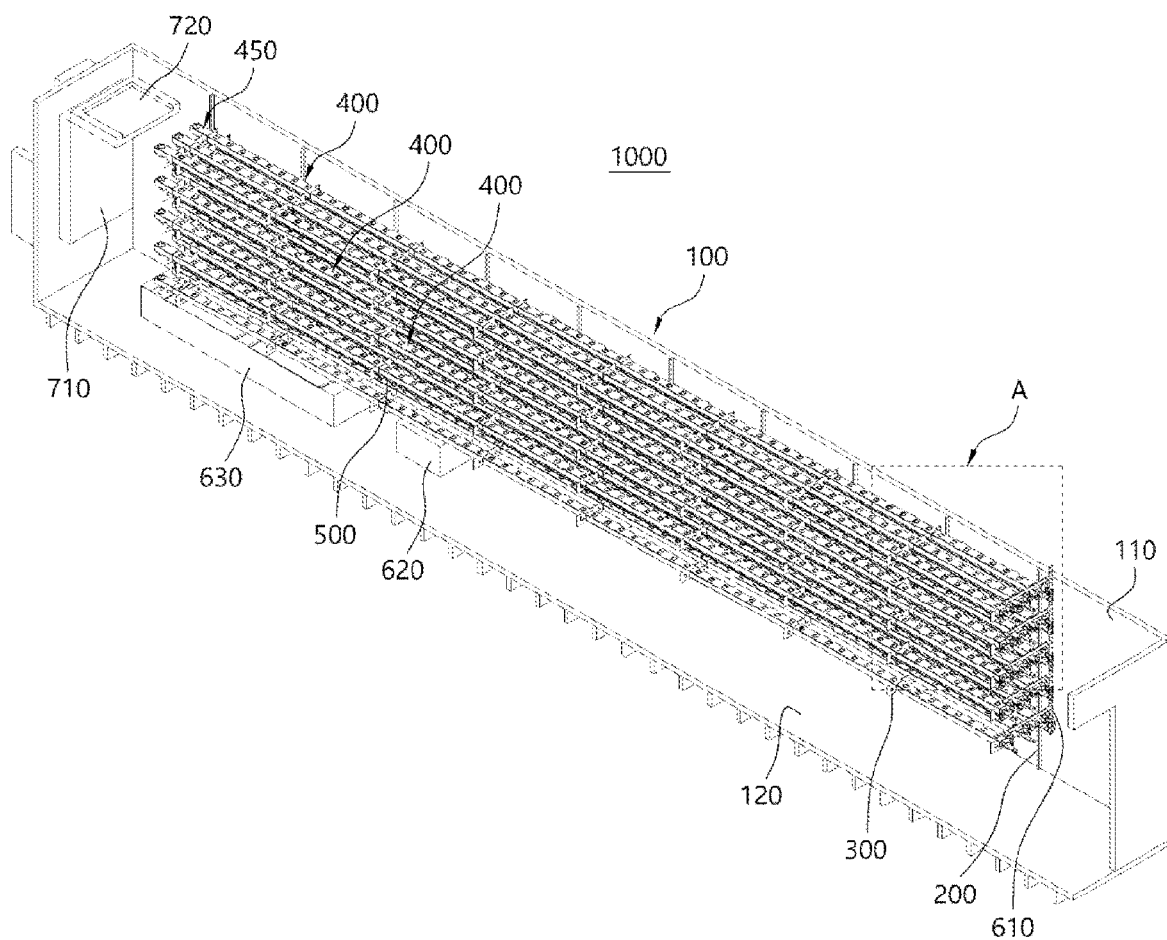
FIG. 1 is a perspective view of a hydroponics apparatus according to an embodiment of the present invention.

Hereinafter, an embodiment of the present invention will be described in detail to be easily implemented by those skilled in the art with reference to the accompanying drawings. The present invention may have various modifications and various embodiments and specific embodiments will be illustrated in the drawings and described in detail. However, the present invention is not limited to specific embodiments, and it should be understood that the present invention covers all the modifications, equivalents and replacements included within the idea and technical scope of the present invention.

Terms including an ordinary number, such as first, second, etc., may be used for describing various constituent elements, but the constituent elements are not limited by the terms. The terms are used only to discriminate one component from the other component.

For example, without departing from the scope of the present invention, a first component may be referred to as a second component, and similarly, the second component may be referred to as the first component. A term 'and/or' includes a combination of a plurality of associated disclosed items or any item of the plurality of associated disclosed items.

Unless otherwise contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Figure 2:
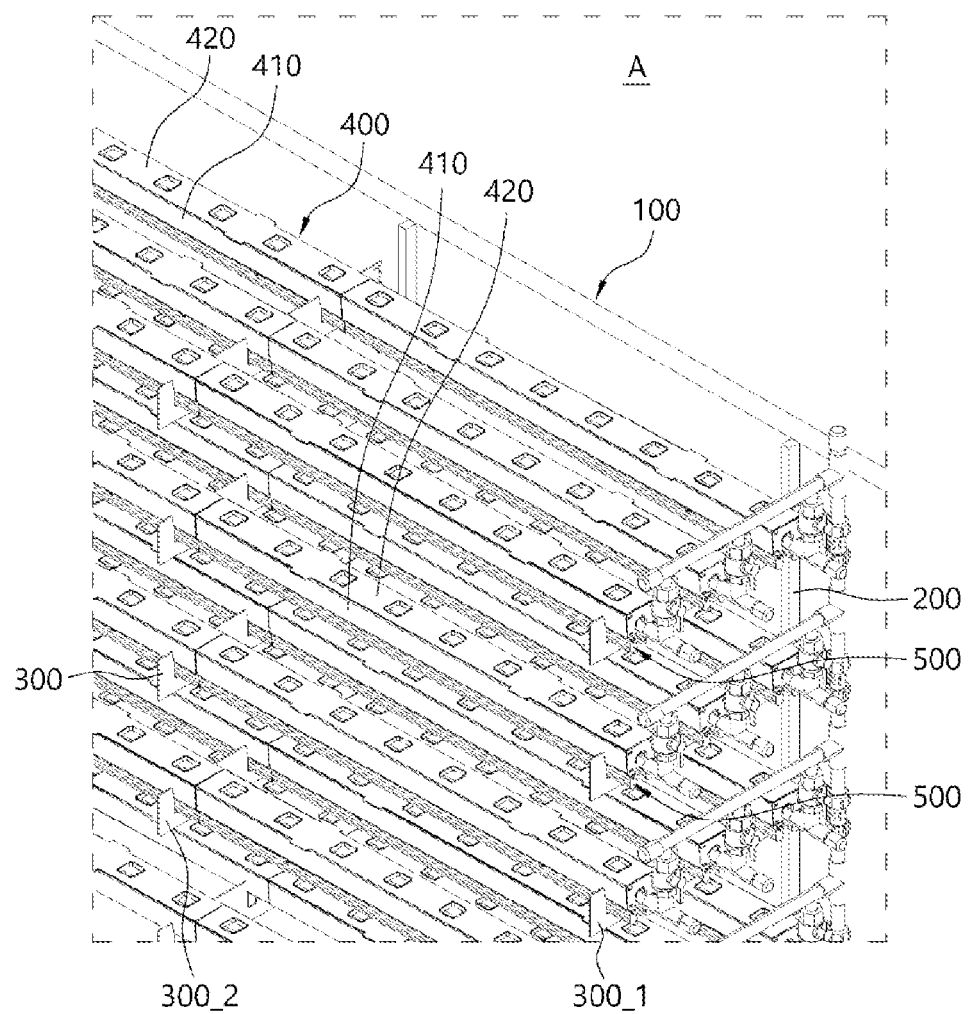
FIG. 2 is an enlarged diagram of area A of FIG. 1.

Hereinafter, a hydroponics apparatus according to an embodiment of the present invention will be described. FIG. 1 is a perspective view of a hydroponics apparatus according to an embodiment of the present invention and FIG. 2 is an enlarged diagram of area A of FIG. 1.

Referring to the drawings, a hydroponics apparatus 1000 according to an embodiment of the present invention includes a housing 100 provided with a large internal space such a container and having a lower surface 120 and one side 110, two or more channels 200 provided vertically on one side 110 of the housing 100 to be spaced apart from each other, brackets 300 coupled to the channels 200, and cultivation modules 400 seated on the brackets 300.

Further, the hydroponics apparatus 1000 according to an embodiment of the present invention may further include light source modules 500 emitting growth light of plants. Further, the hydroponics apparatus 1000 according to an embodiment of the present invention may further include a supply pipe 610 supplying water or a nutrient solution to the cultivation modules 400, a driving motor 620, and a drainage tank 630. In addition, the hydroponics apparatus 1000 may further include a control panel 710 controlling a water amount and a light amount supplied to the cultivation modules and a sensing module 720 sensing plant growth conditions and temperature, humidity, and luminance in the housing.

In one embodiment of the present invention, a plurality of cultivation modules 400 is fitted and coupled to each other to have an extended form and water channels are formed to communicate with each other. The cultivation modules 400 in the extended form are coupled to each channel 200 and seated through a plurality of brackets 300 disposed in a horizontal direction.

At this time, the plurality of brackets 300 are coupled to the channels 200 so that heights are gradually increased or decreased from one-side bracket 300 in the horizontal direction to the other bracket 300 in the horizontal direction to form an inclination of the water channel. That is, the hydroponics apparatus 1000 according to an embodiment of the present invention is configured so that the water or nutrient solution may smoothly move in one direction in the water channel formed in the plurality of cultivation modules 400.

Referring to FIG. 2, when viewed from the front side, the plurality of brackets 300 are coupled to the channels 200 so that a height of a bracket 300_1 supporting a right side of the cultivation module 400 is greater than a height of a bracket 300_2 supporting a left side of the cultivation module 400. As a result, the inclination of the water channel may be formed, so that smooth movement of the water or nutrient solution is made.

As confirmed through FIGS. 1 and 2, in the hydroponics apparatus 1000 according to an embodiment of the present invention, the cultivation modules 400 in the extended form may be disposed with two or more multiple layers. Further, two or more cultivation modules 400 in the extended form may be disposed in parallel on at least one layer among the multiple layers. As such, the cultivation modules 400 in the extended form are formed in multiple rows or columns to maximize the cultivation density.

Hereinafter, the cultivation module 400 of the hydroponics apparatus 1000 according to an embodiment of the present invention will be described in more detail.

Figure 3:
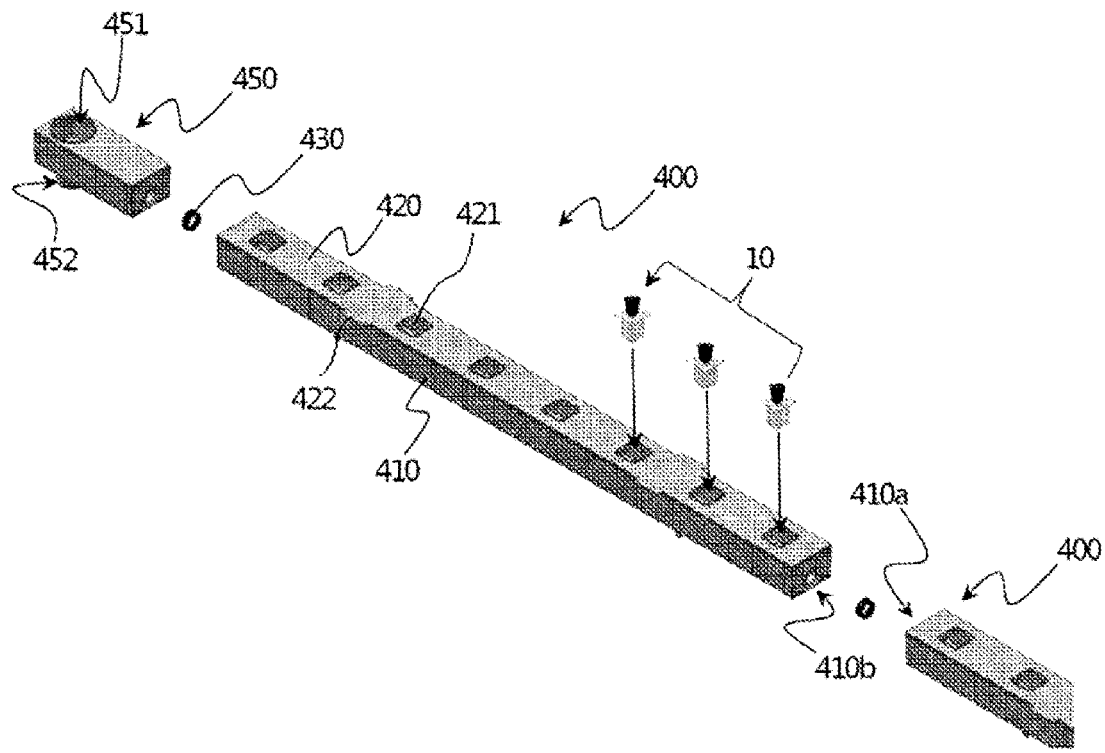
FIG. 3 is a perspective view of a cultivation module of the hydroponics apparatus according to an embodiment of the present invention.
Figure 4:
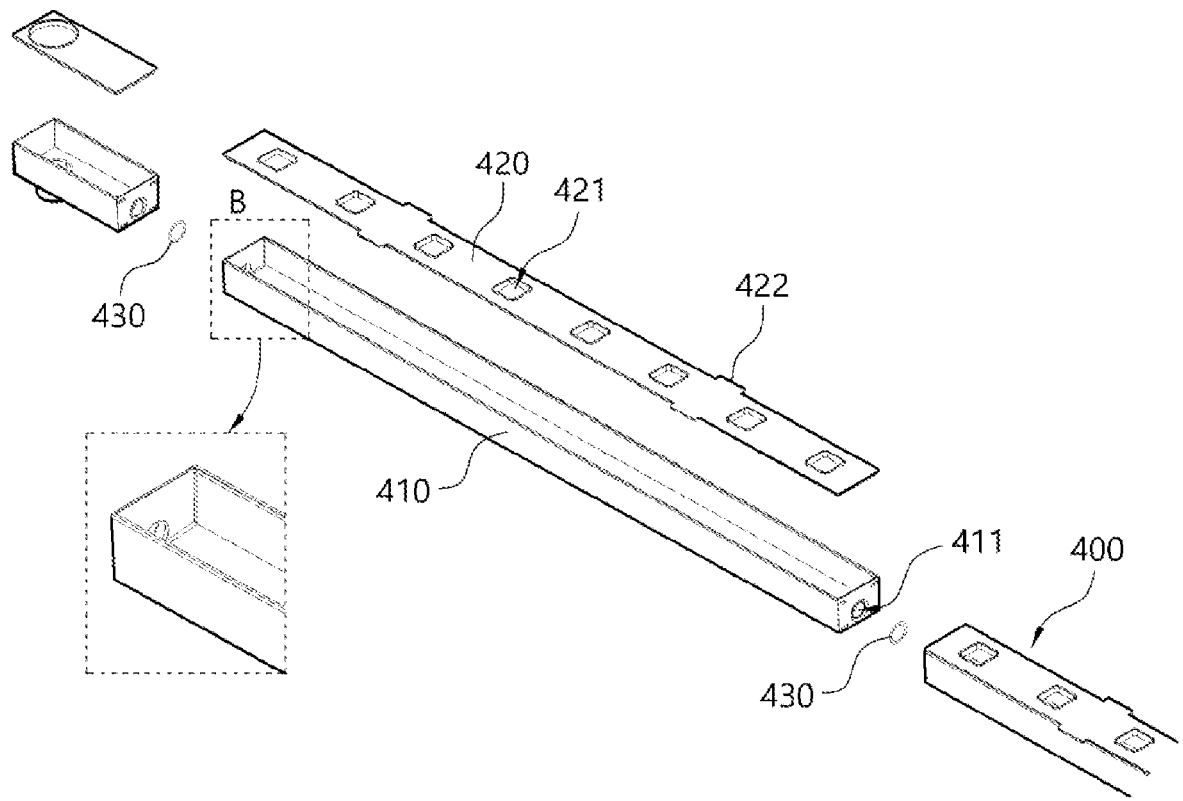
FIG. 4 is an exploded perspective view of FIG. 3.
Figure 5:
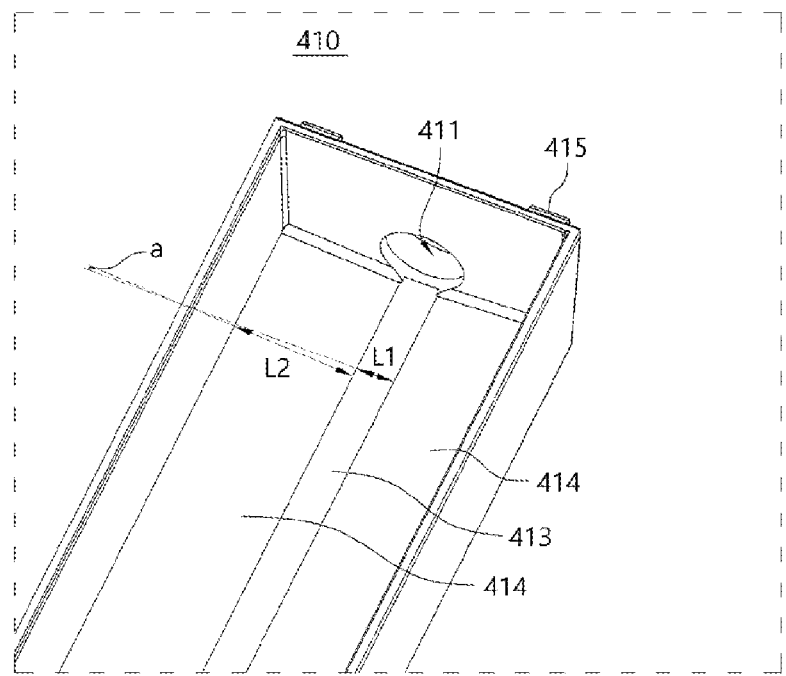
FIGS. 5 and 6 are diagrams illustrating a base end of the cultivation module of the hydroponics apparatus according to an embodiment of the present invention in detail.
Figure 6:
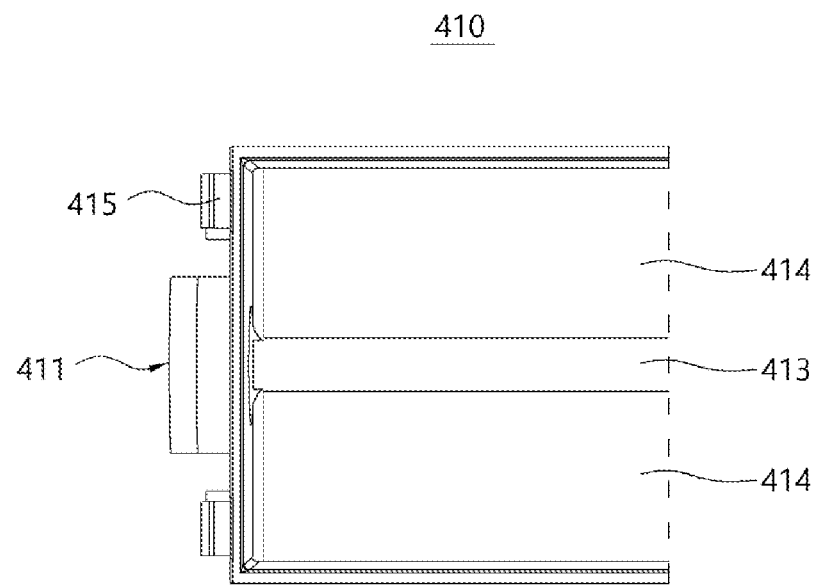

FIG. 3 is a perspective view of a cultivation module of the hydroponics apparatus according to an embodiment of the present invention and FIG. 4 is an exploded perspective view of FIG. 3. In addition, FIGS. 5 and 6 are diagrams illustrating a base end of the cultivation module of the hydroponics apparatus according to an embodiment of the present invention in detail.

Referring to FIGS. 3 to 6, the cultivation module 400 includes a base 410 formed to have an opened upper portion and have a water channel formed therein in a longitudinal direction, and a cover 420 disposed to cover the upper portion of the base 410.

Water through holes 411 are formed at both ends of the base 410. It is preferred that one end of the base 410 is formed with a male coupling portion 410 and the other end thereof is formed with a female coupling portion 410b so that the base 410 is coupled with the base 410 of another adjacent cultivation module 400.

To facilitate continuous coupling, the base 410 may be formed in a rectangular shape as a whole. Further, on one of both ends of the base 410 in the longitudinal direction, a fixing protrusion 415 for coupling with the other base 410 is formed and on the other end thereof, a fixed groove (not illustrated) may be formed.

Furthermore, in order to maintain the tightness of the coupling, it is preferred that a rubber ring 430 is inserted and coupling to the male coupling portion 410a of the end of the base 410 and the female coupling portion 410b of the end of the base 410.

As such, in an embodiment of the present invention, since a plurality of bases 410 may be very easily and continuously coupled to each other and the bases 410 continuously coupled to each other may be disposed in multiple columns and rows through the plurality of brackets 300, the cultivation modules 400 may maximize a cultivation area even in a small space.

Furthermore, a drainage module 450 formed to be connected with the cultivation module 400 may be disposed at the end of the water channel extended and formed with the cultivation modules 400. The drainage module 450 may include a flow path portion that is through-formed in a vertical direction so that water or a nutrient solution of the upper end is introduced into the upper portion and discharged to the lower portion. Specifically, the flow path portion may be formed so that an upper opening 451 formed in the upper portion to receive the water or nutrient solution of the upper end and a lower opening 452 formed in the lower portion to discharge the water or nutrient solution to the lower portion communicate with each other.

Therefore, when the cultivation modules 400 formed to be connected are disposed in multiple layers, the drainage module 450 has a structure in which the water or nutrient solution is dropped from the drainage module 450 of the upper layer to be transferred to the drainage module 450 of the lower layer. To this end, although not illustrated, the drainage module 450 of the upper layer and the drainage module 450 of the lower layer are connected to each other through a pipe to form a drop-type drain path.

At the lower end of the drainage module 450 of the bottom layer, a drainage tank 630 may be disposed to receive the discharged water or nutrient solution to be recycled. Accordingly, the water of the cultivation modules 400 of each layer is completely removed by the drainage module 450 to remove water contained in the cultivation modules 400, thereby maximally suppressing the occurrence of algal blooms.

The base 410 of the cultivation module 400 according to an embodiment of the present invention forms a water channel therein, and the water channel may include a first area 413 formed on a bottom surface of the base 410 in a longitudinal direction and second areas 414 formed at both sides of the first area 413 to be inclined downward toward the first area 413.

As illustrated in FIG. 5, an angle a formed between the first area 413 and the second area 414 may be 2° to 3°. When there is no inclination provided by the second area 414, the water or nutrient solution moves and then frequently stays at both sides in a progressing direction to cause microalgae or bacteria having an adverse effect on plant growth. However, according to an embodiment of the present invention, this problem may be solved by the inclination provided by the second areas 414.

Figure 7:
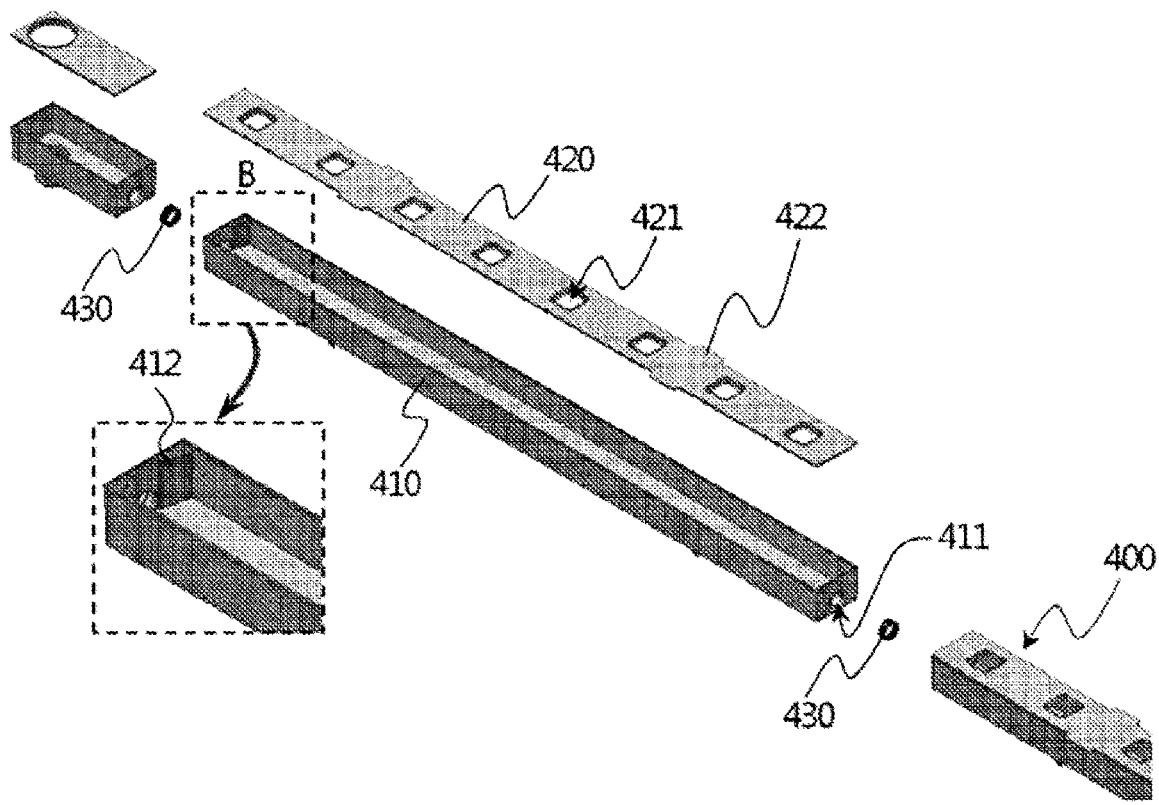
FIG. 7 is an exploded perspective view of a modification of the cultivation module of the hydroponics apparatus according to an embodiment of the present invention.
Figure 8:
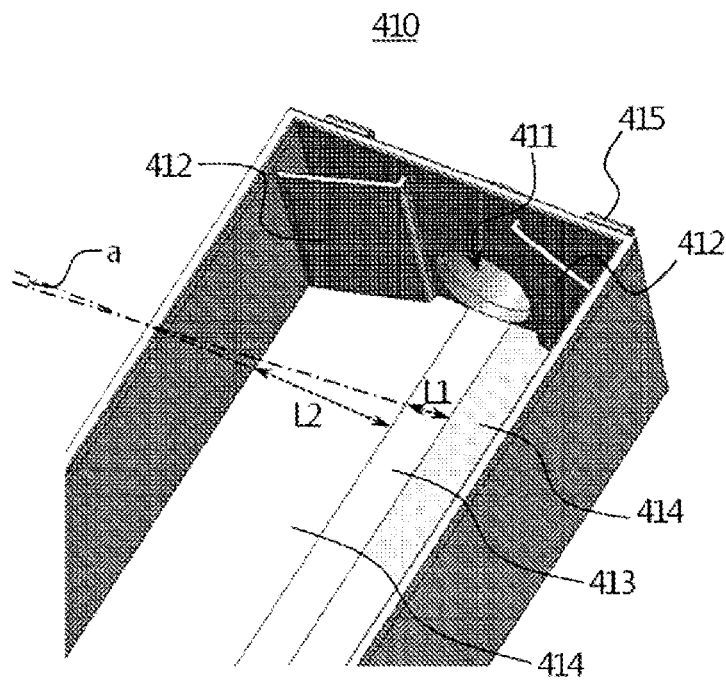
FIGS. 8 and 9 are diagrams illustrating a base end of the modification of the cultivation module of the hydroponics apparatus according to an embodiment of the present invention in detail.
Figure 9:
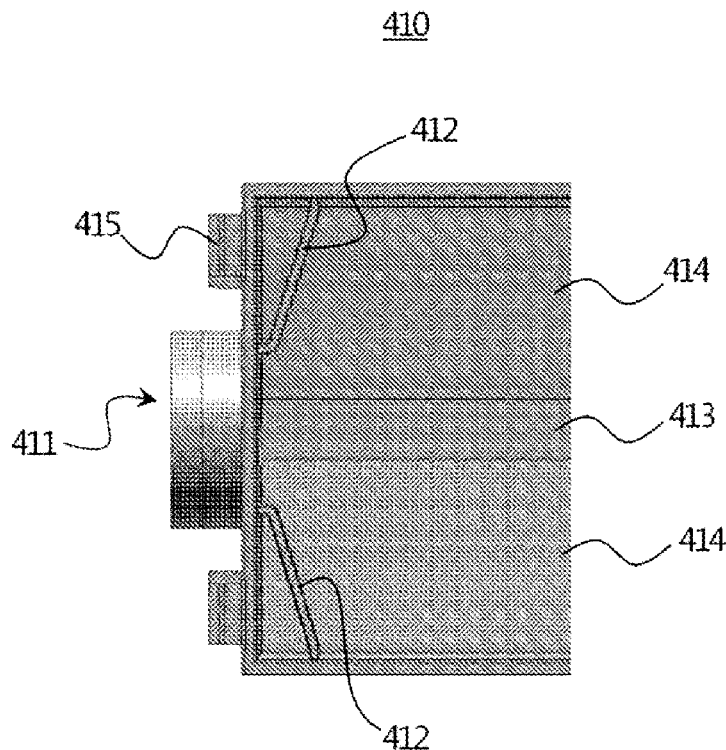

FIG. 7 is an exploded perspective view of a modification of the cultivation module of the hydroponics apparatus according to an embodiment of the present invention and FIGS. 8 and 9 are diagrams illustrating a base end of the modification of the cultivation module of the hydroponics apparatus according to an embodiment of the present invention in detail.

As compared with the embodiment described above, a modification of the cultivation module 400 illustrated in FIGS. 7 to 9 has a difference in that the base 410 further includes ribs 412 which are disposed at both sides of the water through hole 411 therein to converge toward the water through hole 411.

As described above, the water through hole 411 is formed in the base 410 of the cultivation module 400, and in the cultivation modules 400 formed to be continuously connected to each other, the water paths communicate with each other through the water through hole 411. However, as the base 410 is formed in a substantially rectangular shape, there is a possibility that the pooling of the water or nutrient solution occurs at the end adjacent to the water through hole 411. Accordingly, in addition to the divided formation of the first area 413 and the second area 414, when the ribs 412 inclined toward the water through hole 411 are further disposed at the both-side areas of the water through hole 411 at the end of the base 410, it is possible to efficiently prevent the water or nutrient solution from pooling in the both sides of the water through hole 411.

Figure 10:
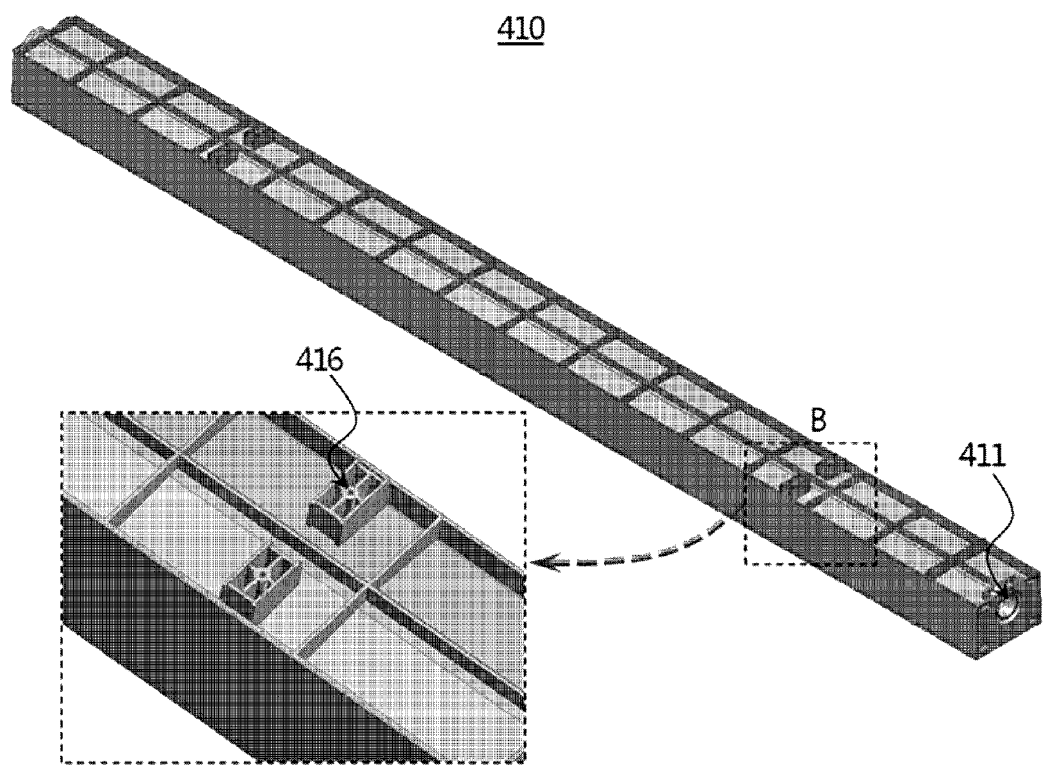
FIG. 10 is a diagram illustrating a bottom surface of the cultivation module of the hydroponics apparatus according to an embodiment of the present invention.

FIG. 10 is a diagram illustrating a bottom surface of the cultivation module of the hydroponics apparatus according to an embodiment of the present invention.

Referring to FIG. 10, screw holes 416 for fixing the light source module 500 emitting light to the cultivation module are formed in the lower surface of the base 410. Preferably, when a holder clip or the like for fixing the light source module 500 is fixed to the screw hole, the light source module 500 may be more simply attached and detached. Therefore, it is possible to significantly reduce the economical cost burden, which occurs by separately installing the light source modules in conventional plant factories.

Figure 11:
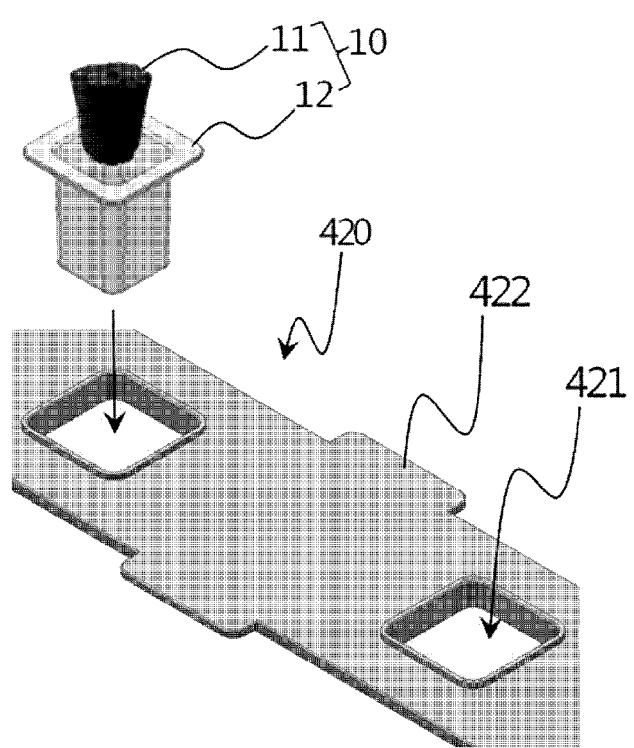
FIG. 11 is a diagram illustrating that a pot module is inserted into the cultivation module of the hydroponics apparatus according to an embodiment of the present invention.

FIG. 11 is a diagram illustrating that a pot module is inserted into the cultivation module of the hydroponics apparatus according to an embodiment of the present invention.

As described above, the cultivation module 400 according to an embodiment of the present invention includes the cover 420. The cover 420 covers the base 410 so that the pot module 10 is inserted to the water channel and mounts the pot module 10 at the same time. For performing such a function, the cover 420 includes an opening 421 into which the pot module 10 is inserted. A plurality of openings 421 may be formed at predetermined intervals along a longitudinal direction of the cover while vertically passing through the cover 420.

Meanwhile, in an embodiment of the present invention, the cover 420 further includes a grip portion 422 to be easily separated from the base 410. The grip portions 422 may be formed to partially protrude from both sides along a longitudinal direction of the cover 420. A user may separate the cover 420 for replacement of the pot module 10 or other management, and at this time, the grip portions 422 allow the cover to be easily removed.

Figure 12:
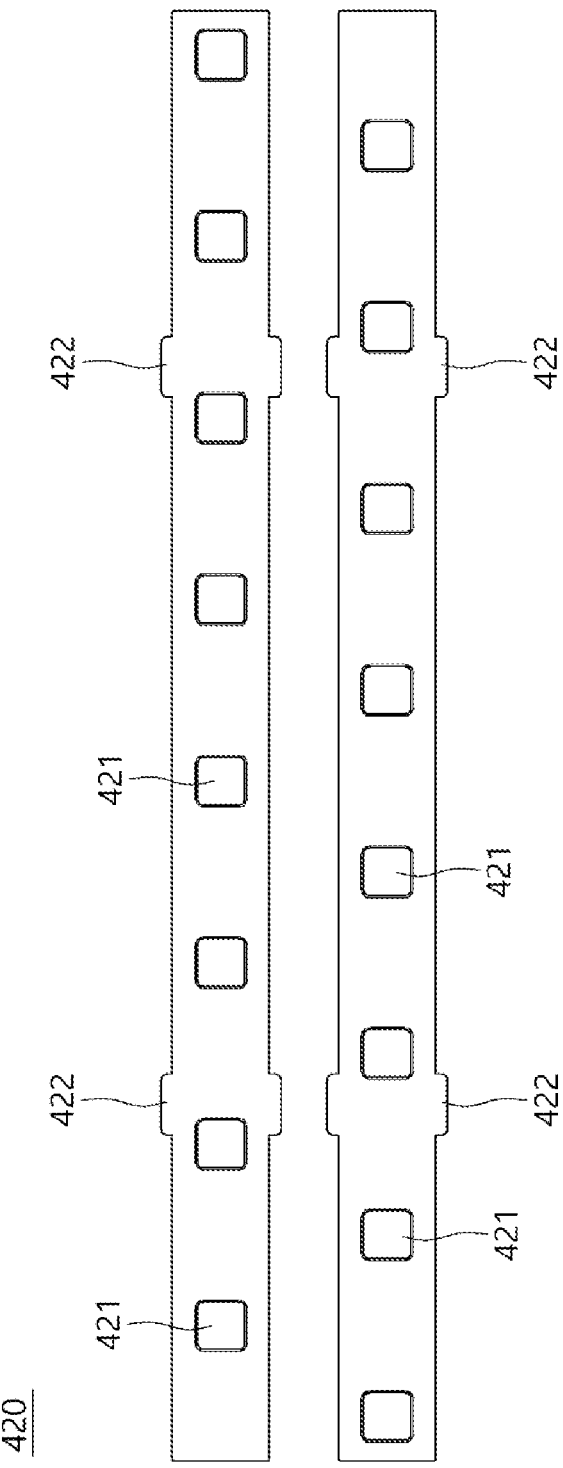
FIGS. 12 and 13 are diagrams illustrating modifications of a cover of the cultivation module of the hydroponics apparatus according to an embodiment of the present invention.
Figure 13:
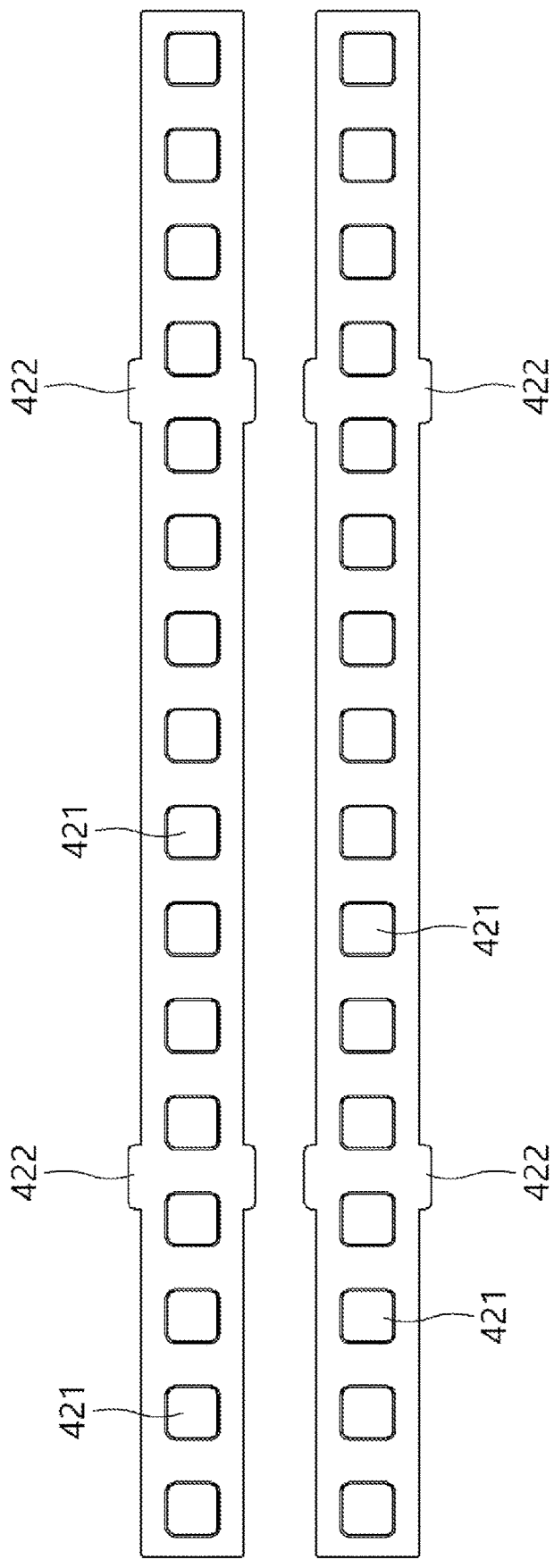

FIGS. 12 and 13 are diagrams illustrating modifications of a cover of the cultivation module of the hydroponics apparatus according to an embodiment of the present invention.

In the cover 420 illustrated in the drawing above, eight openings 421 are symmetrically formed around the longitudinal direction at regular intervals along the longitudinal direction. As compared with this, in a modification of the cover 420 illustrated in FIG. 12, a plurality of openings 421 are asymmetrically formed with respect to the center between one end and the other end of the cover 420 in the longitudinal direction. More specifically, eight openings 421 are asymmetrically formed with respect to the center between one end and the other end of the cover 420 in the longitudinal direction.

According to such a modification, when the cultivation modules 400 are disposed in parallel, the openings 421 of adjacent cultivation modules 400 may be disposed alternately to each other. Through this, plants such as vegetables that occupy a large space during growing may grow while minimizing interference therebetween.

Further, in the modification of the cover 420 illustrated in FIG. 13, as compared with the cover 420 illustrated above, 16 openings 421 are formed at relatively short intervals. That is, more openings 421 per unit length are present. Such a modification may contribute to enhance the cultivation efficiency of the plants such as herbs that occupy a relative small space during growing.

Of course, the number of openings 421 formed on one cover 420 described in the embodiment and the modification is illustrative, and any number of openings may be increased or decreased as needed.

Figure 14:
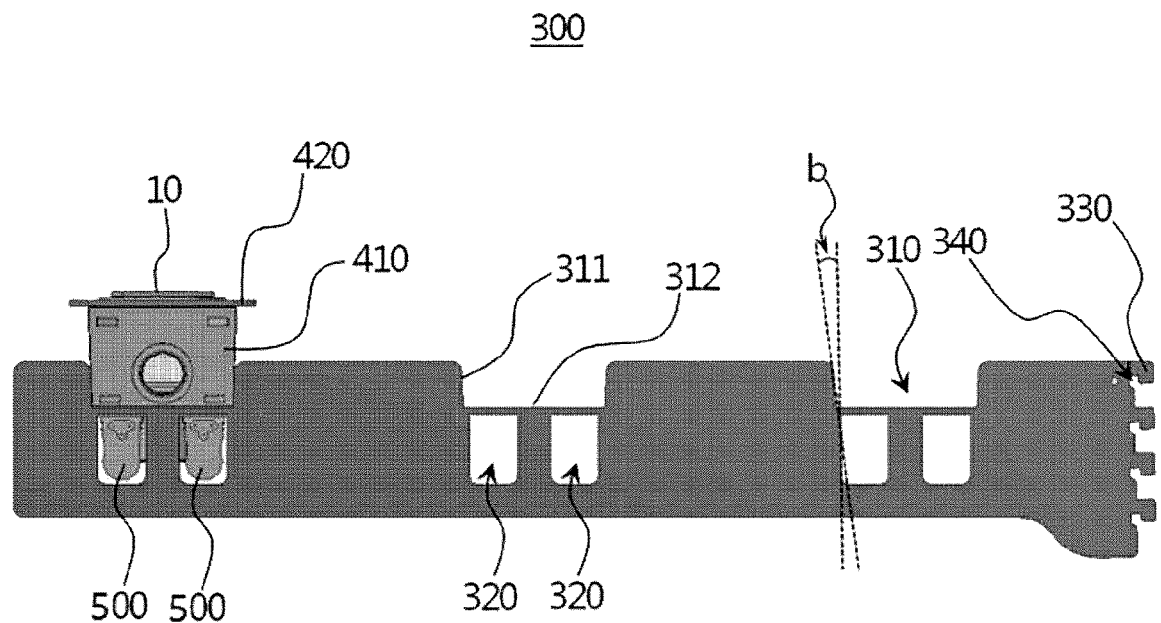
FIG. 14 is a diagram illustrating a bracket of the hydroponics apparatus according to an embodiment of the present invention.

FIG. 14 is a diagram illustrating a bracket of the hydroponics apparatus according to an embodiment of the present invention.

Referring to FIG. 14, when describing the bracket 300 in detail, the bracket 300 may include a base insertion portion 310 and an insertion protrusion 330. The base insertion portion 310 is configured by including a bottom portion 312 at the lower end and a side wall 311 inclined in a form of extending the base insertion portion 310 upward from the bottom portion 312 to form a height. Accordingly, while the base 410 is easily inserted through the upper portion of the base insertion portion 310, the base 410 may be fitted while the insertion of the base 410 is completed. As a result, it is possible to efficiently prevent the shaking of the cultivation modules 400 in the extended form.

Further, the insertion protrusion 330 is formed at one side of the bracket 300 to be inserted to a fastening groove of the channel 200. The insertion protrusion 330 may be formed to protrude in a "¬" shape. The insertion protrusion 330 is fitted to the fastening groove formed in the channel 200. At this time, the bracket 300 includes a buffer portion 340 that is concavely formed inward in an area where the insertion protrusion 330 starts to protrude to more easily combine and remove the bracket 300.

Furthermore, the bracket 300 may further include a light source module insertion portion 320 formed at the lower end of the base insertion portion 310. Accordingly, since the light source module 500 is coupled to the light source module insertion portion 320 of the bracket 300, with the screw groove 416 formed on the lower surface of the base 410, thereby enabling simple and more firmly coupling.

On the other hand, the light source module 500 may include LED packages. More specifically, LED packages emitting white light and light at bands of 650 nm to 670 nm are alternately mounted, and the number of LED packages emitting the white light may be greater than the number of LED packages emitting the light of 650 nm to 670 nm.

The light source module 500 has a form in which LED packages emitting white light and light at bands of 650 nm to 670 nm are alternately mounted for the growth of plants to optimize the plant growth by using light of near-infrared series. At this time, it is preferred that the number of LED packages emitting the white light is greater than the number of LED packages emitting the light of 650 nm to 670 nm, and a form in which 3 to 5 white light packages and one near-infrared package are alternately mounted is most preferably determined.

Figure 15:
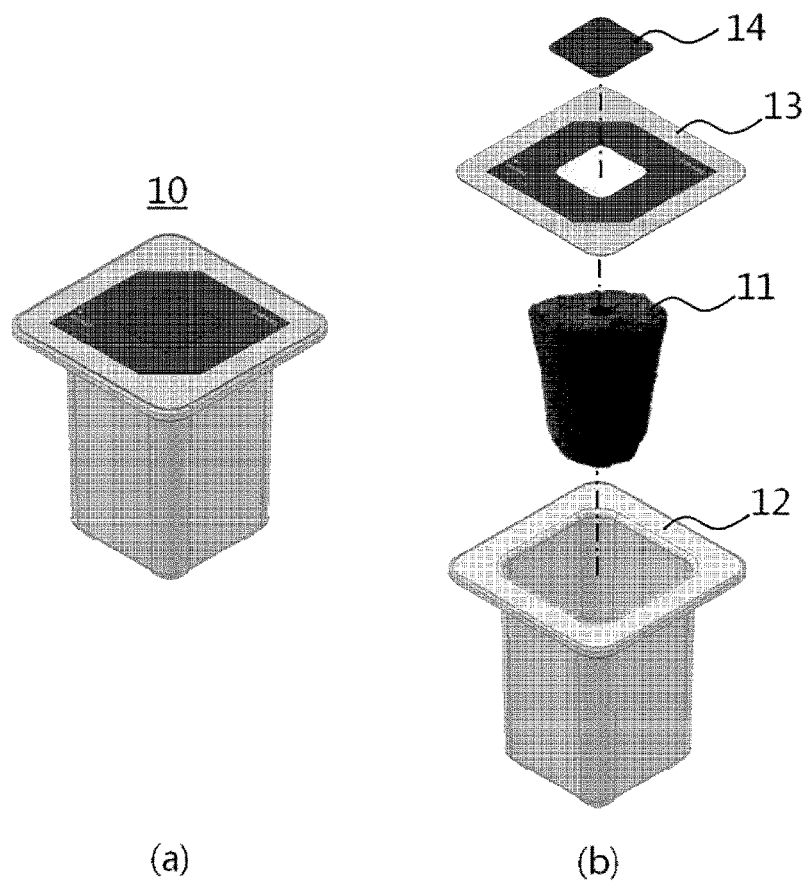
FIG. 15 is a diagram illustrating a pot module of the hydroponics apparatus according to an embodiment of the present invention.

Meanwhile, the hydroponics apparatus 1000 according to an embodiment of the present invention performs the hydroponics by using separate pot modules 10, and FIG. 15 illustrates a pot module of the hydroponics apparatus according to an embodiment of the present invention.

Referring to FIG. 15, the pot module 10 includes a rooting sponge 11 including seeds, and a cultivation pot 12 receiving the rooting sponge 11 and having an opened lower end to be in contact with water in the water channel. Further, the pot module 10 may further include a pot cover 13 attached on an upper end of the cultivation pot 12 for general customers and having an opening center and a sealing sticker 14 attached to the opened area of the pot cover 14. The rooting sponge 11 is a crop growth medium, and seeds are contained inside the central hall thereof, and the seeds are attached to the medium. The cultivation pot 12 is formed as a pot, so that a circular hole is pierced on the lower bottom surface, so that the plant roots may be extended to the outside.

The pot module 10 illustrated in FIG. 15 is illustrative, and the configuration may be changed depending on the cultivation environment, the distribution form of the pot module 10, and the like.

As such, the hydroponics module 1000 according to an embodiment of the present invention efficiently implements large-area high-density plant cultivation through the plurality of cultivation modules 400 connected to each other to be extended and the pot modules 10 capable of being inserted into or removed from the cultivation modules 400 individually.

As described above, preferred embodiments of the present invention have been disclosed in the present invention and the drawing and although specific terminologies are used, but they are used in a general meaning for easily describe the technical content of the present invention and help understanding the present invention and are not limited to the scope of the present invention. In addition to the embodiments disclosed herein, it is apparent to those skilled in the art that other modified examples based on the technical spirit of the present invention can be executed.

The invention claimed is:

1. A hydroponics apparatus comprising:
    a housing;
    two or more channels provided vertically on one side of the housing to be spaced apart from each other;
    brackets coupled to the channels;
    cultivation modules seated on the brackets,
    wherein a plurality of cultivation modules is fitted and coupled to each other to have an extended form and water channels are formed to communicate with each other, the cultivation modules in the extended form are coupled to each channel and seated through a plurality of brackets disposed in a horizontal direction,
    the plurality of brackets are coupled to the channels so that heights are gradually increased or decreased from one-side bracket in the horizontal direction to the other bracket in the horizontal direction to form an inclination of the water channel; and
    a drainage module connected to one end of the cultivation modules in the extended form,
    wherein the cultivation modules in the extended form are disposed with two or more multiple layers,
    wherein among the two or more multiple layers, water supplied in each layer of the two or more multiple layers is completely removed by the drainage module connected to the one end of the cultivation modules.

2. The hydroponics apparatus of claim 1, wherein two or more cultivation modules in the extended form are disposed in parallel on at least one layer among the multiple layers.

3. The hydroponics apparatus of claim 1, wherein the cultivation module includes a base formed to have an opened upper portion and have a water channel formed therein in a longitudinal direction, and a cover disposed to cover the upper portion of the base.

4. The hydroponics apparatus of claim 3, wherein the water channel includes a first area formed on a bottom surface of the base in a longitudinal direction and second areas formed at both sides of the first area to be inclined downward toward the first area.

5. The hydroponics apparatus of claim 4, wherein the base further includes a water through hole formed in an end of the water channel and ribs disposed at both sides of the water through hole in the base to converge toward the water through hole.

6. The hydroponics apparatus of claim 3, wherein the cover includes at least one opening formed along a longitudinal direction of the cover so that a pot module is inserted and a grip portion formed to partially protrude from both sides along the longitudinal direction of the cover.

7. The hydroponics apparatus of claim 6, wherein a plurality of openings are symmetrically formed with respect to the center between one end and the other end of the cover in the longitudinal direction.

8. The hydroponics apparatus of claim 6, wherein a plurality of openings are asymmetrically formed with respect to the center between one end and the other end of the cover in the longitudinal direction.

9. The hydroponics apparatus of claim 1,
    wherein the drainage module includes a flow path portion that is through-formed in a vertical direction so that water or a nutrient solution of the upper end is introduced into the upper portion and discharged to the lower portion.

10. The hydroponics apparatus of claim 9, wherein the drainage module is disposed in each of the plurality of layers, and
    the drainage module of the upper layer and the drainage module of the lower layer are connected to each other through a pipe to form a drop-type drain path.

11. The hydroponics apparatus of claim 1, wherein the channel includes a plurality of fastening grooves in a longitudinal direction, and
    the bracket includes an insertion protrusion inserted into the fastening groove at one side.

12. The hydroponics apparatus of claim 11, wherein the insertion protrusion is formed to protrude into a '¬' shape on one side of the bracket.

13. The hydroponics apparatus of claim 12, wherein the bracket further includes a buffer portion formed concavely in an area where the insertion protrusion starts to protrude.

14. The hydroponics apparatus of claim 1, further comprising:
    a light source module emitting light to the cultivation modules.

15. The hydroponics apparatus of claim 14, wherein the light source module is disposed on a lower surface of the cultivation module.

16. The hydroponics apparatus of claim 14, wherein in the light source module, LED packages emitting white light and light at bands of 650 nm to 670 nm are alternately mounted, and the number of LED packages emitting the white light is greater than the number of LED packages emitting the light of 650 nm to 670 nm.

17. The hydroponics apparatus of claim 14, further comprising:
    a sensing module sensing at least one of temperature, humidity, and luminance in the housing; and
    a control panel controlling the water amount and the light amount supplied to the cultivation modules.

* * * * *